Figure 1:
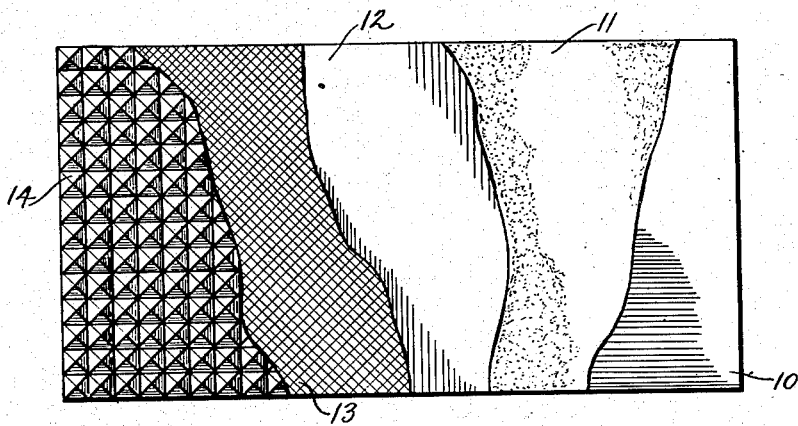

Jan. 2, 1945. R. E. MORRIS 2,366,209
METHOD OF VULCANIZING RUBBER TREADS TO DECKS
Filed Aug. 18, 1942

INVENTOR
Ross E. Morris
BY
ATTORNEY

Patented Jan. 2, 1945

2,366,209

UNITED STATES PATENT OFFICE 2,366,209

METHOD OF VULCANIZING RUBBER TREADS TO DECKS

Ross E. Morris, Vallejo, Calif.

Application August 18, 1942, Serial No. 455,239

5 Claims. (Cl. 154—2)

(Granted under the act of March 3, 1883, as amended April 30, 1928; 370 O. G. 757)

This invention relates to deck treads and to the new and improved method of applying the said treads to the surface of a metal deck. More particularly, this invention relates to improvements in the method of securing deck treads set forth in my copending application, Serial No. 396,335, filed June 2, 1941.

Heretofore, fully vulcanized mattings or treads have been secured to the surfaces on the metallic decks of ships in order to obtain an anti-slip tread. Considerable difficulty has been experienced in the past in maintaining good adherence between the mattings and deck surface. This difficulty was traceable to failure in some instances between the cement and the metal and in othe rinstances to failure between the cement and the matting. With the advent of rubber-halide, rubber-hydrohalide, and thermoprene cements, the difficulties encountered in obtaining proper adherence between the cement and the metal were apparently overcome. However, these cements were found to produce an insecure bond between the fully vulcanized mattings and the cement. I have discovered that a superior and highly satisfactory bond may be obtained between the cement and the matting or tread by using a composite matting having an unvulcanized lower layer and a vulcanized upper layer upon which an anti-slip design is impressed, said upper layer being formed of a material which has a great resistance to wear and abrasion. In this manner I have designed a deck tread which utilizes the best abrasive-resisting top stock available and the best bottom stock to adhere to the bonding cement.

Unvulcanized natural rubber compositions and unvulcanized or uncured synthetic compositions possess an adhesive quality not found in the same compositions after they have been fully vulcanized. I propose, therefore, to utilize this superior adhesive quality of the unvulcanized material and synthetic rubber compounds to obtain a superior bond between the matting or tread and the cement.

It is an object of this invention, therefore, to provide a new and improved composite deck tread.

It is a further object of this invention to provide a new and improved method of securing such deck treads to a metallic surface.

It is also a further object of this invention to provide a method of securing a composite deck tread having a lower stock of unvulcanized rubber in which an ultra-accelerator is introduced into the lower stock by diffusion so that the bottom layer can be made to vulcanize in several days at ordinary temperatures.

Figure 2:
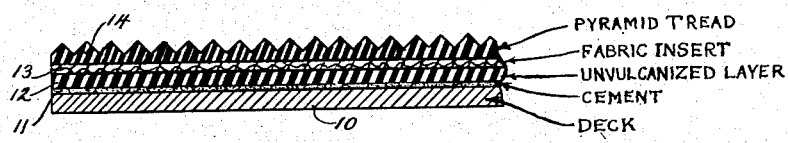

On the drawing:

Fig. 1 is a plan view of the composite product which embodies this invention in which the upper layers of tread are cut away to show underlying layers; and Fig. 2 is an elevational side view.

As shown on the drawing, the reference numeral 10 indicates the metal deck to which is applied a cement coating 11. The tread is shown as composed of an upper and lower layer 14 and 12, respectively, having an intermediate lightweight fabric insert 13 which is preferably prepared from a square woven fabric weighing not more than 2.6 ounces per square yard. The upper layer 14 is formed of a vulcanized stock of natural or synthetic rubber having a suitable anti-slip design impressed upon its top surface. The lower layer 12 is composed of an unvulcanized or uncured stock of natural or synthetic rubber. The method of manufacture of these new and improved treads will be more particularly set forth later in this specification.

The method of securing the composite treads to the deck surface follows:

*Process with neoprene.*—The following steps are applicable where the deck covering material is a polymerization product of chloro-2-butadiene-1,3, which is commercially known as neoprene, as one of its constituents.

*Preparation of the deck.*—In order that satisfactory adhesion between the tread and the deck may be obtained, it is absolutely necessary and essential that the metal surface of the deck be perfectly clean before application of the cement. An unpainted deck may be cleaned by scrubbing it with a strong hot aqueous solution of trisodium phosphate (Oakite) or sodium bicarbonate, thoroughly washing with fresh water, drying and then grit blasting with a grit free from oil or grease. A painted deck should be cleaned by chipping the paint from the deck surface, washing the chipped areas with a suitable paint solvent, wire brushing and then grit blasting with a clean grit. In view of the fact that grit blasting is unfavorable on board ship because of the possibility of and dangers resulting from the grit finding entrance into rotary machines, the deck may be cleaned by being buffed with a power driven buffer using a #24 grit aluminite or aloxite paper. I have noted in practical applications of this invention that a power driven wire brush when used for final cleaning leaves a thin film of grease or dirt on the metal surface; consequently, its use is not recommended except for shallow crevices that cannot be cleaned otherwise. In all events, the deck surface should be bright, rough and free from all traces of rust, grease or dirt.

The location of the treads is preferably marked out on the clean deck surfaces by using a mask of scotch tape. The size of the marked-out areas should be ½" or so larger in both dimensions than the size of the tread, care being exercised to see that no lapped joints or crevices deeper than 1/16" are contained within the masked area. All rivets included within the area masked out should have their heads ground flush with the deck surface.

*Application of cement.*—The cement is preferably applied to a cold deck which has been protected from the direct rays of the sun and should also be applied only in dry weather with an outside temperature not lower than 55° Fahrenheit. Before applying the cement, the deck is washed and scrubbed with carbon tetrachloride or a clean rag wet with toluene or other aliphatic or aromatic solvent to remove all traces of oil or grease. The portion of the deck to be covered is then painted with a single thin coat of rubber chloride or other rubber halide cement, which cement has been thoroughly stirred before being applied to the deck. It is important to note that only one thin coat of this cement is required; a heavy coat or more than one coat will impair the adhesive quality of the tread. After the cement has dried for one hour, a coat of a 25% cement prepared by dissolving a stock of the unvulcanized lower layer of the deck tread in toluene or other suitable solvents is applied to the area coated with the rubber halide cement. This neoprene cement is preferably brushed on to obtain an even application and must be allowed to dry for one hour. A second coat of the prepared neoprene cement is likewise applied and permitted to dry for one hour. A third coat is applied and allowed to dry for exactly ten minutes. It is important that a single coat of rubber chloride or rubber halide cement and at least one coat of neoprene be applied immediately after the deck has been cleaned and the area over which the treads are to be placed has been marked out.

*Preparation of the covering material.*—In manufacture of the composite treads, a coating of cement dough made from the stock of the upper vulcanized layer of the tread is spread on both sides of the fabric insert 13. A stock of the following composition has proven satisfactory for the upper vulcanized layer:

| | |
|---|---|
| Neoprene type GN | 100.0 |
| Stearic acid | 0.5 |
| Neozone A (phenyl-alpha-naphthylamine) | 2.0 |
| Stamford #33 brown factice (vulcanized oil) | 20.0 |
| XLC magnesia (extra light calcined magnesia) | 4.0 |
| Pelletex (semi-reinforcing carbon black) | 75.0 |
| Permalux (di-ortho-tolylguanidine salt of dicatechol borate) | 1.0 |
| Zinc oxide | 5.0 |

The coated fabric insert is applied to the back stock while the latter is still warm. A satisfactory formula for the backing stock is given below:

| | |
|---|---|
| Neoprene type GN | 100.0 |
| R. P. A. #3 (xylyl mercaptan (10%) in hydrocarbon solvent) | 3.0 |
| Neophax A (vulcanized oil) | 50.0 |
| Cottonseed oil | 10.0 |

This particular composition is calendered onto a holland cloth backing so as to have a finished gauge of 0.060 inch and the top stock is calendered on to the fabric insert so as to have a finished gauge of 0.070 inch. The assembled tread with the top surface down is then placed in a mold and the mold inserted into a hydraulic press for vulcanizing the top layer. The mold is constructed in such a manner as to give a pyramid impression on the top surface of the upper layer of the tread. The top platen of the press is water cooled so as to prevent transmission of heat to the unvulcanized bottom layer of the tread. The bottom surface of the tread is protected by the holland cloth during vulcanization of the top layer in the press so that the bottom surface will remain perfectly clean and in an unvulcanized or uncured state, thus presenting an unvulcanized surface for the cement to adhere to when it is attached to the deck.

It has been observed that the cloth impression faces of commercial mattings are all contaminated with the soap-stone, mica, or other suitable lubricating agents. These lubricating agents are used to prevent the matting from sticking to the canvas during the vulcanization in the press. These lubricating agents also effectively prevent the matting from adhering to the bonding agents when securing the matting to the deck surface and are therefore detrimental to the adhesion of the matting and should not be used.

When using a hard rubber mold in the hydraulic press having an overall thickness of 5/32", a curing time of 45 minutes with 60 lb. p. s. i. steam pressure in the lower platen of the hydraulic press has proven to produce satisfactory vulcanization and anti-slip tread impressions on the upper layer of tread, with the backing stock showing no sign of vulcanization. The bottom layer may be tested to see that it has not vulcanized by trimming back the outer edge of the lower tread for a distance of 3/16". For best results, the treads manufactured in accordance with the process referred to above should be installed on the deck within seven days after vulcanization and during the time interval between vulcanization and actual application to the deck, the prepared treads should be stored in a space maintained at a temperature with the range of 85° to 100° Fahrenheit.

*Laying the covering.*—While the last coat of neoprene is drying for the ten minute period, the holland backing cloth is stripped off the back or bottom layer of the tread and the unvulcanized surface is vigorously scrubbed with a clean rag wet with toluene or other aromatic solvent. The entire bottom surface of the tread should be very tacky after this treatment with toluene. After the last coat of neoprene cement has dried for ten minutes, the tread is then applied to the cemented surface. It is advisable to use small treads and keep them separated by at least 3/4 of an inch. In applying the tread, every effort should be made to prevent the trapping of air between the tread and the cemented surface. This can best be done by first pressing one end of the tread into position on the deck while holding up the other end of the tread. A heavy iron roller, not more than 4" wide and weighing at least 50 lbs. per inch of contact is then rolled over at the lower end and back and forth over the tread working toward the other end until the entire tread has been rolled down.

*Trimming the cover.*—After the treads have been down for about twenty-four hours, the corners are rounded at about a 2" radius and the edges are beveled. It is important that the bevel be made at a relative flat angle.

The above process is specifically limited to the application of three coats of neoprene cement. This is, however, a minimum requirement and in case the deck is severely pitted, more than three coats may be required in order that the pitts may be filled with the solvent compound. The above process is not necessarily limited to the use of toluene as a solvent in the preparation of a 25% neoprene cement. In fact, satisfactory results have been obtained by using a solvent obtainable on the market under the trade name of "Union Solvent #8." Likewise, "Union Solvent #8" may be used to wash the deck prior to the application of the single coat of rubber halide cement and the unvulcanized surface of the tread may be scrubbed with "Union Solvent #8" instead of toluene.

*Modifications of the process with natural rubber.*—When natural rubber is used as a deck covering rather than a material containing neoprene, the process may be modified as follows:

1. A rubber hydrohalide or thermoprene cement may be used instead of the rubber halide cement specified above. If thermoprene cement is used, such as that obtainable on the market under the trade name of "Vulcalock," and containing a cyclized rubber dissolved in an aromatic solvent, one coat of a 50–50 mixture of thermoprene cement and a solvent such as toluene is applied to the deck surface immediately after the sand blasting operation. This is then followed by three coats of a 100% thermoprene cement. Each coat except the last is allowed to dry until it is no longer tacky.

Typical formulas for the top and bottom stock which are used when the composite tread is made of a natural rubber composition are given below:

*Top stock*

| | |
|---|---|
| Smoked sheet (natural rubber) | 100.0 |
| Pelletex black (semi-reinforcing) | 75.0 |
| Zinc oxide | 5.0 |
| Heliozone (sunproof wax) | 1.0 |
| Stearic acid | 3.0 |
| Neozone A (phenyl-alpha-naphthylamine) | 1.0 |
| R. P. A. #2 (33⅓% naphthyl-beta-mercaptan, 66⅔% inert hydrocarbon) | 0.5 |
| Captax (mercaptobenzothiazole) | 1.0 |
| Zimate (zinc dimethyl dithiocarbamate) | 0.1 |
| Sulfur | 2.5 |

*Bottom stock (not to be cured)*

| | |
|---|---|
| Smoked sheet | 100.0 |
| Brown factice (vulcanized oil) | 25.0 |
| Mineral oil | 10.0 |
| Neozone A | 2.0 |
| R. P. A. #2 | 1.0 |

The primary advantage in the use of rubber is that an ultra-accelerator can be introduced into the unvulcanized bottom layer by diffusion. As yet, no method has been presented for introducing an ultra-accelerator by diffusion into a neoprene, butyl rubber, or butadiene copolymer rubbers. By using accelerator diffusion, the bottom unvulcanized layer can be cemented to the deck in its unvulcanized state and attain a state of vulcanization in several days at ordinary temperatures.

To introduce an ultra-acceleration by diffusion, the above process is modified as follows:

1. At the time the last coat of thermoprene cement is applied, two coats of a 50–50 mixture of carbon disulfide and toluene are brushed on the bottom surface of the matting. Both the cemented deck surface and the treated unvulcanized layer of the deck tread are allowed to dry about three minutes before applying the tread to the cemented area of the deck surface. If the process is to be carried out by the artisans of the ship's company, it is preferable to weigh down the tread by using sand bags and at a pressure of approximately 25 lbs. per square foot. These bags are allowed to remain in place for at least twenty-four hours and then they may be removed and the edges of the tread may be beveled and the corners rounded.

Instead of using sand bags, a heavy corn roller, not more than 4" wide and weighing at least 50 lb. per inch of contact may be rolled over the lower end and back and forth over the tread working toward the other end until the entire tread has been rolled down.

The following is a typical formula for the bottom stock adopted to be cured by diffusion of carbon disulfide:

| | |
|---|---|
| Smoked sheet | 100.0 |
| Zinc oxide | 10.0 |
| Brown factice | 25.0 |
| Mineral oil | 10.0 |
| Neozone A | 2.0 |
| R. P. A. #2 | 1.0 |
| Dibenzylamine | 2.0 |
| Sulfur | 4.0 |

An experimental panel was prepared by the method outlined above using a thermoprene cement "Vulcalock" and after storage for eight months, the adhesion of the tread to the steel was tested and found to be 37 lb. per inch width at 80° F. and 4 lb. per inch width of tread at 150° F. At 80° the test strips tore within the rubber thereby showing the rubber-Vulcalock bond to be stronger than the rubber itself. At 150° F., the test strip tore loose at the Vulcalock to metal bond. Since the rubber hydrohalide cements are less thermo plastic than is Vulcalock or other thermoprene cements, the adhesion at high temperatures is improved by using a hydrohalide cement. The term thermoprene cement is intended to include as a class the various cyclo-rubbers as defined in the U. S. Patents Nos. 1,605,180; 1,617,-588; 1,744,880; and the publications by The Research Association of British Rubber Manufacturers, 1935, page 28, "Rubber, Physical and Chemical Properties," by T. R. Dawson and B. D. Porritt, and also as set forth in the "Journal of Industrial and Engineering Chemistry," volume 19, page 1325, 1927.

The invention described herein may be manufactured and used by or for the Government of the United States of America for governmental purposes without the payment of any royalties thereon or therefor.

I claim:

1. A composite matting adapted to be cemented to a metal deck to form an anti-slip tread therefor comprising an upper layer of vulcanized rubber-like polymerized chloroprene having an anti-slip design impressed upon its exposed surface, a lower layer of plastic unvulcanized rubber-like polymerized chloroprene, and an intermediate layer of a fabric.

2. A product comprising the composite matting defined in claim 1 and including a layer of metal, and a layer of a cement containing a rubber halide interposed between the layer of metal and the layer of plastic unvulcanized rubber-like polymerized chloroprene of said matting.

3. The method of securing the composite deck tread defined in claim 1 to a metal deck surface which includes the steps of washing a cleaned area of the deck's surface with a rubber solvent, coating said washed area with a thin layer of rubber halide cement, applying to the rubber halide cement, after it has dried, at least three coats of a 25% cement prepared by dissolving the stock of said unvulcanized layer in a solvent, each coating of said 25% cement being applied only after the previously applied coating has dried completely, superimposing said tread upon said cemented area with said lower layer adjacent thereto before the last coating of said 25% cement has dried completely so that said unvulcanized lower layer will form a firm bond with said cement.

4. The method of securing a composite deck tread comprising an upper layer of vulcanized polymerized chloroprene having an anti-slip tread impressed thereon upon its exposed surface and a lower layer of uncured plastic polymerized chloroprene to a metal deck surface which includes the steps of coating a cleaned area of the deck's surface with a thin layer of a rubber halide cement, applying to said cement-coated area after it has dried a coating of a cement prepared by dissolving a stock of uncured polymerized chloroprene in a solvent, and placing said composite tread on said cement-coated area with its uncured surface downward before said polymerized chloroprene cement has completely dried whereby to form a secure bond between the said matting and said cement.

5. The method of securing a deck tread comprising an upper layer of vulcanized polymerized chloroprene having an anti-slip tread impressed thereon upon its exposed surface and a lower layer of uncured plastic polymerized chloroprene to a metal deck surface which includes the steps of coating a clean area of the deck's surface with a thin layer of rubber hydrohalide cement, applying to said cement-coated area, after it has dried, a coating of a cement prepared by dissolving a stock of uncured polymerized chloroprene in a solvent, scrubbing the exposed surface of the unvulcanized layer of said tread with an aromatic solvent, and placing said composite tread on said cement-coated area with the scrubbed surface downward before said polymerized chloroprene cement has completely dried whereby to form a secure bond between said matting and said cement.

ROSS E. MORRIS.